UNITED STATES PATENT OFFICE.

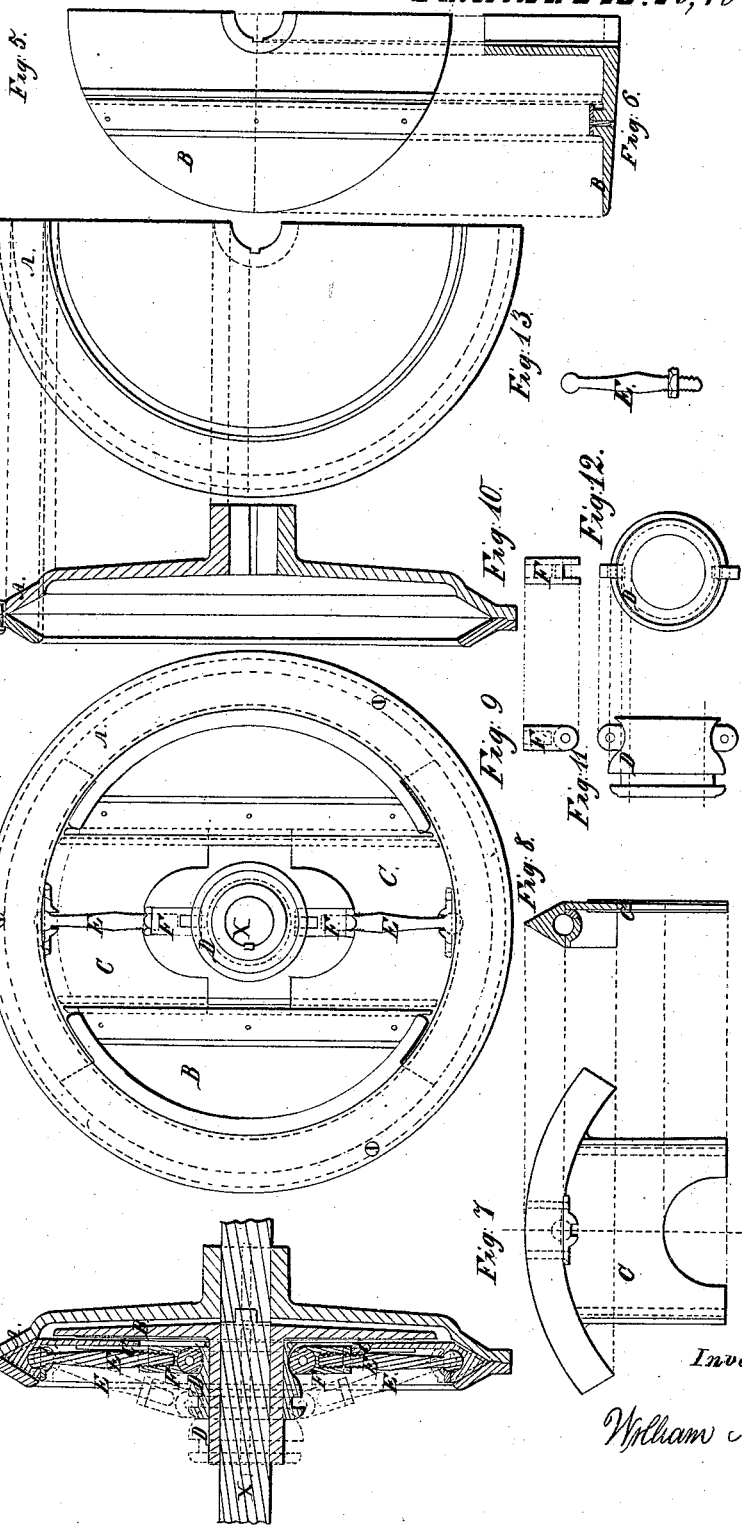

WILLIAM MASON, OF PROVIDENCE, RHODE ISLAND.

IMPROVEMENT IN CONNECTING AND DISCONNECTING SHAFTING.

Specification forming part of Letters Patent No. 34,512, dated February 25, 1862.

*To all whom it may concern:*

Be it known that I, WILLIAM MASON, of the city of Providence and State of Rhode Island, have invented a new and useful friction coupling or machine for connecting and disconnecting shafting, also for connecting shafting to gears or other wheels rotating upon the shaft; and I do declare that the following is a full, clear, and exact description of the same, reference being had to the annexed drawings, making a part of this specification, in which—

Figures 1 and 2 are views, plan and elevation, respectively, showing the whole coupling, in which the parts are iron or other metal. Figs. 3 and 4 are views, plan and elevation, from a section of Figs. 1 and 2 marked letter A, showing the wheel of two rims which form the V-shaped recess. Figs. 5 and 6 are views, plan and elevation, from a section of Figs. 1 and 2 marked letter B, showing the disk or plate upon which the segments C C slide radially, also showing the hub of the disk upon which the sleeve D slides longitudinally. Figs. 7 and 8 are views, plan and elevation, from a section of Figs. 1 and 2 marked C, showing the V or wedge segments, which are fitted to slide radially between ribs cast on the face of the disk B. It also shows a socket to receive and cap to retain the ball on the screw-arm E. Figs. 9 and 10 are views, plan and elevation, from a section of Figs. 1 and 2 marked F, showing the toggle-joint which connects with the sleeve D, also forms a nut to receive the screw-arm E. Figs. 11 and 12 are views, plan and elevation, from a section of Figs. 1 and 2 marked D, showing the sleeve which slides on the hub of the disk B, also showing a groove to receive a shipper-fork. Fig. 13 is a view from a section of Figs. 1 and 2 marked E, showing an arm having a ball on one end for connecting with the segment C and screw on the other end to connect with the toggle-joint F. It also shows a check-nut for securing the arm when adjusted.

The same letters indicate like parts in all the figures.

The object of my invention is to overcome the difficulty experienced when and where it is desirable to connect and disconnect a shaft or part of a line of shafting without checking the motive power. My object therefore is to overcome this difficulty by using a friction-coupling in which the mechanical powers of the wedge and toggle-joint are united to produce friction necessary to make the coupling effectual and reliable.

My invention consists in constructing and using a coupling of two parts, each part firmly secured to its respective shaft. The first part consists of a disk or plate with two or more V or wedge segments fitted to slide radially between ribs cast on the face of the disk, and are held in their places laterally by caps riveted to the ribs. Said segments are connected to a sleeve on the hub of the disk by means of adjustable arms and joints. The sleeve has a groove to receive a shipper-fork attached to a lever. The sleeve and V or wedge segments are so arranged relatively that when the sleeve is moved toward the disk the segments are forced outward and into a groove of same angle and circle in part second, thereby producing the necessary friction for driving the adjacent shaft, gears, or wheels to which part second is attached. By a reverse movement of the sleeve the shaft is disconnected. Part second consists, essentially, of two rims turned separately and bolted together, so as to form a V-shaped recess. Said rims may be attached to the shaft or to gears or other wheels rotating upon the shaft. In either case it operates substantially the same.

In the accompanying drawings, A represents the wheel of two rims.

B represents the disk or plate.
C represents the wedge-segments.
D represents the sleeve.
E represents the adjustable arm.
F represents the toggle-joint.

I do not claim the sleeve, rods, or segments as patented by Wendell Wright, June 15, 1852, for friction-pulleys, neither do I claim any particular angle for the wedge-segments; but What I do claim, and desire to secure by Letters Patent, is—

1. The two rims united A, or equivalent, forming the V-shaped recess, when used in combination with the wedge-segments C C and toggle-jointed connections, as described, substantially as specified.

2. The wedge-segments C C when used in combination with the arms, disk, and sleeve, as described, for the purposes set forth.

3. The application of the above-described mechanism to shafting, gears, or other wheels rotating upon the shaft for a friction-coupling, substantially as specified.

WILLIAM MASON.

Witnesses:
 DAVIS C. BURKE,
 SAMUEL DAVIS.